Dec. 4, 1928.

L. C. F. HORLE 1,693,899

GRID LEAK

Filed April 19, 1923

Inventor
Lawrence C. F. Horle

By John B. Brady,
Attorney

Patented Dec. 4, 1928.

1,693,899

UNITED STATES PATENT OFFICE.

LAWRENCE C. F. HORLE, OF NEWARK, NEW JERSEY, ASSIGNOR, BY MESNE ASSIGNMENTS, TO FEDERAL TELEPHONE MANUFACTURING CORPORATION, OF BUFFALO, NEW YORK, A CORPORATION OF NEW YORK.

GRID LEAK.

Application filed April 19, 1923. Serial No. 633,241.

My invention relates broadly to radio transmission and reception systems, and more particularly to a construction of grid leak employed in electron tube circuits used in radio systems.

One of the objects of my invention is to provide a grid leak construction wherein the value of resistance may be selected and adjusted to meet the requirements of the characteristics of each electron tube with which the grid leak is to be used in circuit.

A further object of the invention is to provide a grid leak with a protective casing from which the leak resistance may be readily removed as occasion demands to adjust the value of the leak resistance for any variations which occur in the characteristics of the electron tube with which it is used during the operating life of the tube.

Another object of the invention is to provide a grid leak having minimum inductance and distributed capacity.

A further object of the invention is to construct a grid leak with a minimum number of parts capable of inexpensive manufacture on a quantity production basis with a maximum uniformity in the grid leak.

Another object is to provide a grid leak construction having simple parts capable of ready assembly.

Figure 1:
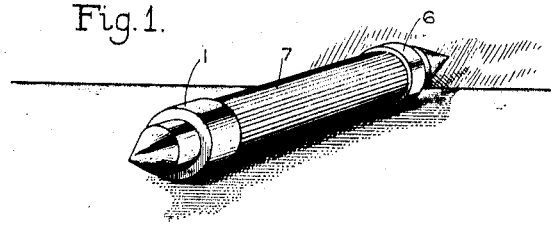
Figure 2:
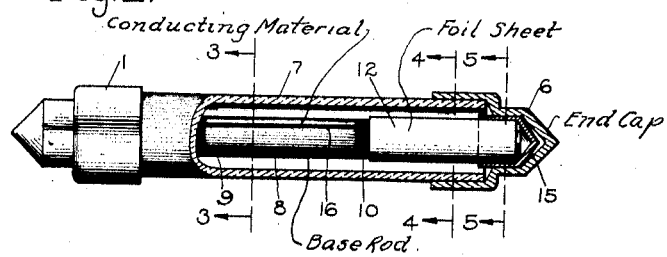
Figure 3:
Figure 4:
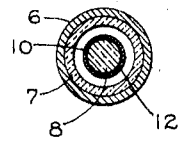
Figure 5:
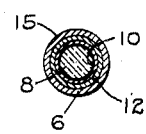
Figure 6:
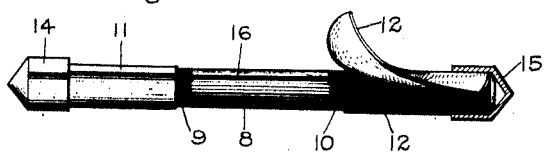
Figure 7:
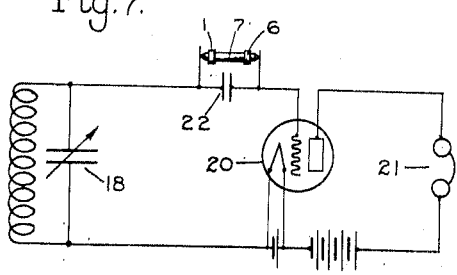

Other and further objects of the invention will be pointed out in the following specification and referred to in the accompanying drawings, in which:

Figure 1 is a perspective view of my grid leak assembled; Fig. 2 is a side elevation of the grid leak with the enclosing casing partially broken away showing the parts partially in section; Figs. 3, 4 and 5 are sectional views of the grid leak taken on lines 3—3, 4—4, and 5—5 of Fig. 2; Fig. 6 is a side elevation of the resistance unit of the grid leak, removed from the enclosing casing, with parts partially removed and in section; and Fig. 7 is a circuit diagram representing one electrical connection in which my grid leak is intended to function.

Heretofore in the art there have been three general types of grid leaks: The first of these consists of a conducting material drawn down to a fine wire and wound on a base of insulating materials; the second consists of a sintered mass of refractory material, such as kaolin, with a finely divided conducting material intimately mixed therewith; and the third consists of a porous, fibrous, insulating material such as paper inpregnated with a fluid mixture of a finely divided conducting material held in suspension or in solution in a volatile liquid.

These several types have many inherent disadvantages which are overcome by my present invention.

The wire type has the disadvantage of a very high distributed capacity and inductance where it is made in units having a relatively high resistance. The cost of this construction is very high.

The sintered type consists of finely divided conducting material in a well fired refractory insulating material. Since the resistivity, that is, resistance per unit volume, can be made very great, this type of construction makes possible a resistance unit of minimum inductance and distributed capacity. It is exceedingly difficult however to make it of predetermined resistance since the thoroughness of the admixture of the materials of the raw mixture is difficult to gauge and even more difficult to maintain constant. Furthermore, the firing process results in changes of the nature of the mixture, depending on the temperature attained in the firing, the time of firing, and the nature of gases or material in contact with the unit during the firing process. While the firing temperature and time may be fairly accurately gauged and duplicated, the changes in the nature of the material resulting from the presence of gases or vapors in the process of firing make it impracticable to obtain a uniform product. This makes it necessary in the manufacture of this type of unit to approximate as closely as possible all the conditions essential to the manufacture of a unit of the proper resistance, and after the units are complete to choose those which more nearly approximate the required resistance value, and to reject those departing too far from the required value. The great number of rejected units which result from this type of construction makes this type of unit exceedingly expensive, if the resistances of all acceptable units are to approximate a predetermined value. In addition to the variations in manufacture these sintered units vary in resistance with minor changes in temperature when in use. The reason for this is somewhat in doubt, but it appears that the sintered mass is actually a solution of the conducting material in the solvent refractory material and that minor changes of temperature result in changes in the intimacy with which the conducting material is involved in the refractory material. For these several reasons the sintered type of resistance unit is both very expensive to manufacture and unsatisfactory in use.

The impregnated paper type of grid leak is difficult to manufacture. It consists of paper or other fibrous material which has been completely or partially impregnated with a solution or an emulsion of finely divided conducting material in a volatile liquid. The evaporation leaves the paper saturated with the conducting material, but in such a finely divided state as to give it a high resistance. If care is taken in choosing a uniform and constant quality of paper and in using a constant proportion in the impregnating material it will be found that the resultant impregnated paper will have reasonably uniform resistivity throughout the sheet, and pieces of this sheet of uniform size will have uniform resistance. It is found, however, that this is only true where great care is taken to prevent the flexure of the paper in the cutting or assembly process. Any flexure of the paper invariably increases the resistance of the paper tremenduously. This always occurs when the finely divided conducting material has been applied to a porous material or one having a porous surface, and appears to result from the fact that in such a type of construction a large percentage of the particles of the conducting material are separated from one another by the extremely fine but tough fibers of the paper. When the paper is bent or flexed in any way, not only is the conducting material itself distorted by the distortion of the fibrous base, but the tough fibers of the base material which permeate the conducting material tear the conducting material from itself and result in a tremendous increase in resistance. The change in resistance of the conducting material due to its distortion is usually of minor importance but the changing of the resistance due to the tearing effect of the fibrous base makes this type of resistance extremely unsatisfactory, since in the manufacture of this type of grid leak, the processes of cutting, handling and assembling the impregnated fibrous material are always accompanied by flexure with the resultant change of resistance. This type of construction is doubly difficult of use since it is necessary in this type, as in any other, to make good electrical contact to the impregnated conducting material, and by the very compressible nature of the base material this is impracticable of accomplishment without the compression and distortion of the fibrous material and consequent distortion and disruption of the conducting material. Because of these unavoidable major variations of resistance in the processes of manufacture, the paper type of construction requires, as does the sintered type, the selection of only those units after manufacture is complete, which approximate the required resistance, and because of the large number of rejections this paper type is also relatively expensive.

This type of resistance unit is subject to change in resistance with changes in temperature and humidity, and it is also subject to variations under conditions of mechanical shocks. These changes result from the fact that the fibers of the base tear the particles of the conducting material from itself whenever the fibers are disturbed, as when they expand with increased temperature or by the absorption of moisture, or from flexure due to shock. The presence of moisture will, of course, in itself cause a variation of resistance, but the change in resistance due to the swelling of the fibrous base and the consequent tearing of the particles of conducting material by the fibers of the base is so much greater as to overshadow the ordinary electrical effect of the presence of the moisture.

All these types of resistance units suffer in that the value of their resistance cannot be changed after they are completely assembled. The variation of the resistance of such a resistance unit is frequently highly desirable, especially where such a resistance is to be used with and suited to an electron tube detector, which, itself, changes frequently. In the past this need for variation has been met by having available a host of resistance units of different values and by the substitution of one resistance for another whenever that becomes necessary. This makes the cost of the operation of such a detector unduly expensive and makes impracticable the choosing of the exact value of resistance unless a tremendous number of units are available.

My invention is free of these disadvantages which make prior types of resistance units difficult and expensive to manufacture and unsatisfactory to use. I provide an insulated base material having electrically conductive end portions arranged to form terminals for the resistance unit. The leak resistance is formed by a conductive coating upon the insulated base and the entire unit slipped into an enclosing protective case also having end terminals providing external connections. The resistance unit may be readily removed from the protective casing and the value of the resistance controlled by rubbing the conductive coating on or off the base material until the resistance has become the desired value when it may be returned to its case and slipped into the circuit for operation until further change is warranted.

Referring more particularly to the drawings, reference characters 1 and 6 indicate metallic mounting caps which fit securely over the ends of an insulated enclosing casing 7. The caps are made of a metal sufficiently ductile to be easily drawn and still sufficiently resilient to allow the caps made from it to removably grip the ends of the protecting case when assembled and yet be capable of being rapidly withdrawn from the ends of the enclosing casing. The resistance unit includes a rod 8 of physically dense and mechanically strong insulating material, having a normally extremely high surface resistivity, and a smooth non-porous surface. A conducting material such as graphite is spread over the entire surface of the rod 8 and particularly on the end portions 9 and 10. In the process of manufacture the rod is thoroughly coated with the conducting material by rubbing a stick of the conducting material over the length and ends of the rod until the surface of the rod is generously coated with the conducting material. The unit is then placed in an electrical circuit which measures its resistance and the conducting material rubbed off until the resistance has become the desired value indicated by the remaining path of the conducting material at 16. The metallic foil sheets 11 and 12 are then wrapped about the ends of the rod and the metallic caps 14 and 15 driven securely on the ends of the rod 8 over the foil sheets. The presence of the foil sheets 11 and 12 makes possible a good electrical contact between the conducting material 9 and 10 and the metal caps 14 and 15 without disturbing the layer of conducting material, since any pressure will deform the soft foil without disrupting the continuity of the coating of conducting material, and the metal caps 14 and 15 serve to secure the foil and to make good electrical contact with it and to serve for making contact with the terminal caps 1 and 6. The protecting case 7 serves to protect the unit against moisture, dust, and from contact which would disturb the resistance, and serves as a convenient grip for inserting and removing the unit from a mounting.

Fig. 3 is a sectional view through the grid leak taken on line 3—3 showing the enclosing casing 7 and the insulated rod 8.

Fig. 4 is a section through line 4—4 of Fig. 2 and shows how the resilient metallic terminal cap 6 grips the casing 7. The rod 8 is shown in section with a layer of conducting material 10 about its surface and the foil sheet 12 wrapped over the conductive material. The sectional view in Fig. 5 is taken on line 5—5 of Fig. 2 and shows the terminal cap 6 frictionally supporting the end cap 15 which is driven over the tin foil sheet 12 which is in turn wrapped over the conducting surface 10 on the rod 8.

In Fig. 6 the tin foil sheet 12 has been shown slightly peeled back, indicating the method of wrapping the foil sheet on the conducting surface 10 to insure good contact with the end cap 15. The terminal caps 1 and 6 are freely removable from the casing 7 and normally frictionally engage caps 14 and 15 and support the resistance unit within the casing. By removing one of the end caps, for example 6, by a slight withdrawing force, the resistance unit may be taken out of the enclosing casing and the conducting material rubbed on or off the rod 8 as represented at 16 in order to arrive at the desired value.

The grid leak is used in an electron tube circuit, an example of which is illustrated in Fig. 7. This diagram represents a radio receiving circuit in which the grid leak is shunted across the grid condenser 22 in the circuit connected with electron tube 20. The resonant input circuit is indicated at 18 and the output circuit at 21.

In my present construction of grid leak the lack of uniformity of resistance between elements produced under approximately similar conditions is completely removed, since the resistance is determined only by the nature of the conducting material and the thickness of the layer. The conducting material does not penetrate the rod but is in intimate contact with itself throughout the mass of its layer, so that slight flexure of the rod will not appreciably alter the relation of the particles of the conducting material to one another and thereby not alter the resistance. Not only is it free from change due to flexure, but because of the non-fibrous or non-porous structure of the base material it is free from the great variations of resistance that are present in other types due to changes in temperature, humidity, and due to shock. The resistance of the unit depends only on the nature of the conducting material and the thickness of the layer, and since the thickness is readily controllable in the process of rubbing the conducting material on or off the rod, the unit may be very accurately adjusted to any desired resistance, and since the foil which is secured to the dense base material by the metal cap causes no appreciable compression or other distortion in the base material or the conducting material, but concentrates all compression or distortion in the foil itself, the securing of the contact making foil in no way affects the resistance.

Because of these several advantages characteristics of my device, it is possible to manufacture it with any desirable degree of precision of resistance and with practically no rejections in the process of manufacture.

My invention has a further advantage over prior devices, in that it may be changed in resistance by the mere addition or removal of the conducting material from the surface of the unit. This is especially valuable where it is used as a grid leak in connection with an electron tube detector, since the resistance unit can be removed from the protective case, inserted in the mounting which is connected in the circuit of the electron tube, and while the tube is being used the resistance can be increased or decreased until the best operating value has been obtained. The case is then replaced and the unit re-inserted into the circuit. This is especially important when it is borne in mind that an electron tube detector, such as the commonly used gas tube, changes its characteristics very frequently and requires frequent variation of the grid leak resistance.

While I have described my invention in a certain specific embodiment, I intend no limitations other than imposed by the scope of the appended claims.

What I claim is:

1. A grid leak comprising a cylindrical casing, a pair of resilient caps longitudinally slidable over the ends of said casing, each of said caps having a central conical portion protruding outwardly from the casing, a resistance element comprising an insulated rod having conductive material on the surface thereof, metallic foil wrappings upon said material at each end of said rod, conical metallic cap members engaging the metallic foil wrappings, said last mentioned cap members conforming in shape to the interior contour of the first mentioned caps whereby said rod may be centrally positioned within said casing, and the conductive material thereon maintained in spaced relation to the interior walls of said casing.

2. A grid leak comprising in combination, a cylindrical resistance unit having a conductive surface, terminal caps on opposite ends of said unit, a protective casing, resilient terminal caps for frictionally engaging said casing, said resilient terminal caps comprising a substantially cylindrical portion and a substantially conical portion, said cylindrical portion being arranged to be sprung over the ends of said casing and said conical portion being arranged to receive the ends of said resistance unit whereby said resistance unit may be quickly removed and returned to said protective casing and said conductive surface increased or diminished to fix the value of the resistance.

3. A grid leak comprising in combination, a cylindrical resistance unit having a conductive surface, terminal caps on opposite ends of said unit, a protective casing, resilient terminal caps for frictionally engaging said casing, terminal caps comprising a cylindrical portion of a diameter sufficient to enable said cap to be sprung over the end of said casing, and a central portion substantially cylindrical and conical in shape and arranged to serve as a seat for opposite ends of said resistance unit whereby said resistance unit may be positioned within said protective casing in a line spaced from the walls of said casing and quickly removed and returned to said casing and said conductive surface increased or diminished to select the value of the resistance.

4. A grid leak comprising in combination, a cylindrical resistance unit having a conductive surface, terminal caps on opposite ends of said unit, a protective casing, resilient terminal caps for frictionally engaging said casing said resilient terminal caps comprising a pair of cylindrical portions of different diameters and a conical shaped end closure for the cylindrical portion of smaller diameter, the cylindrical portion of larger diameter being arranged to spring over the ends of said protective casing for positioning said resistance unit in an axial line within said casing in a manner whereby the resistance unit may be quickly removed and returned to said protective casing and said conductive surface increased or diminished to fix the value of the resistance.

LAWRENCE C. F. HORLE.